May 20, 1930. H. A. MEDIN 1,759,166
RIBBON FOR USE IN MAKING INFUSIONS OF COFFEE AND OTHER MATERIAL
Filed July 25, 1927 2 Sheets-Sheet 2

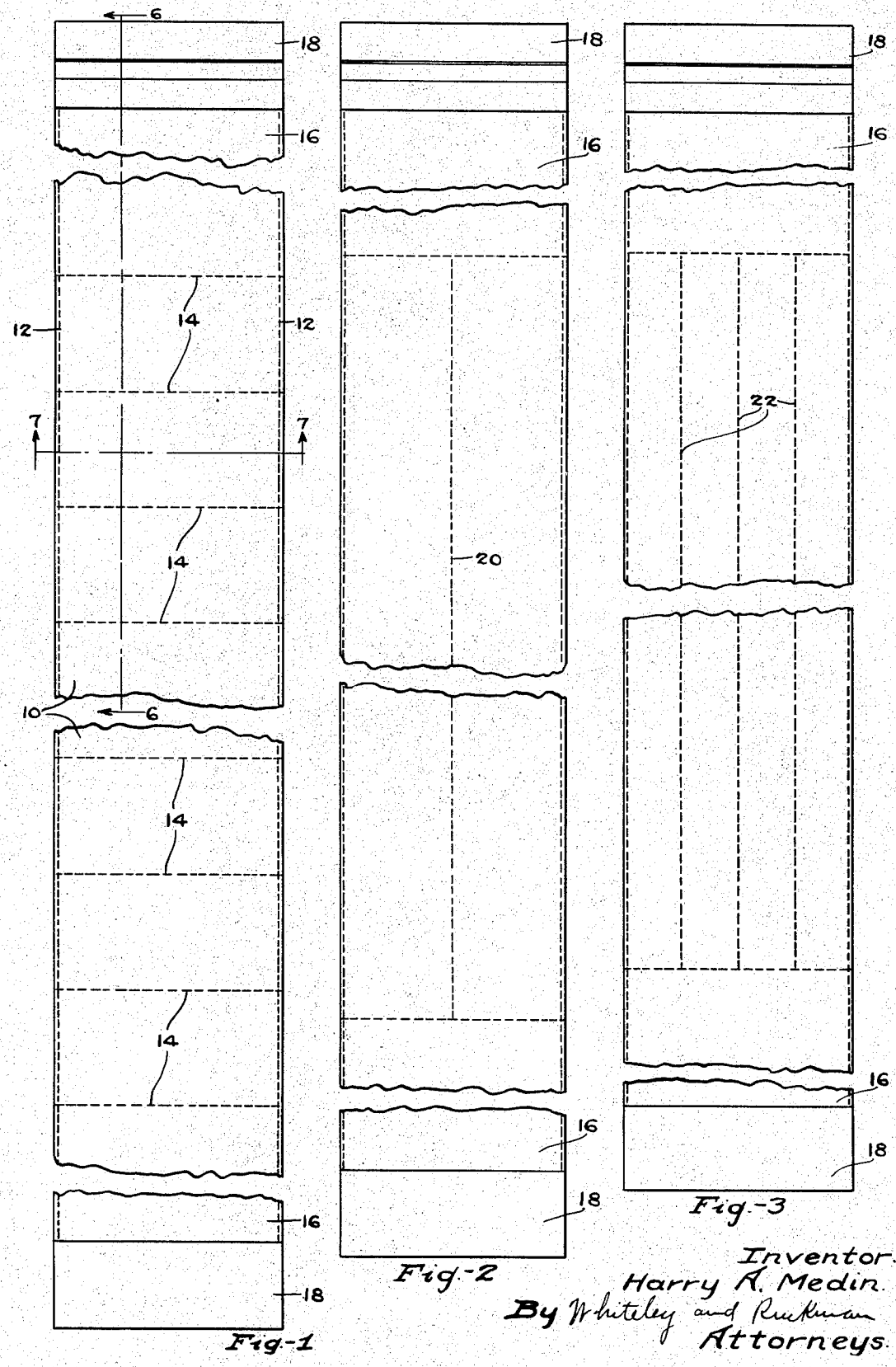

Inventor:
Harry A. Medin.
By Whiteley and Ruckman
Attorneys.

Patented May 20, 1930

1,759,166

UNITED STATES PATENT OFFICE

HARRY A. MEDIN, OF MINNEAPOLIS, MINNESOTA

RIBBON FOR USE IN MAKING INFUSIONS OF COFFEE AND OTHER MATERIAL

Application filed July 25, 1927. Serial No. 208,169.

My invention relates to ribbons for use in making infusions of coffee and other material. Before the time of my invention, it has been proposed to make infusions of coffee by feeding the ground coffee into a receptacle where it is subjected to the action of hot water and it has been proposed to make infusions of coffee, tea, etc., by placing material in sacks and subjecting the filled sacks to the action of hot water. But so far as I am aware, it has never before been proposed to place the coffee or other material to be infused in ribbonlike form. An object of my invention, therefore, is to provide ribbons of the material to be infused in order that the same may be progressively subjected to the action of an infusing agent for extracting the desired properties from the material. The ribbons preferably consist of pervious, flexible material such as woven fabric employed in the form of flat casings which are filled or nearly filled with the coffee or other material which is to be treated. These ribbons when thus made up are intended to be progressively subjected to the action of hot water or other infusing agent for extracting the essential properties of the material. It will be understood that any convenient means may be employed for feeding the ribbons while at the same time subjecting them to the action of the infusing agent. A machine for such purpose is disclosed and claimed in my application Serial Number 268,400 filed April 9, 1928.

The full objects and advantages of my invention will appear in connection with the detailed description thereof, and the novel features of my inventive idea will be particularly pointed out in the claim.

In the accompanying drawings which illustrate my invention in some of the forms in which it may be embodied,—

Figure 4:
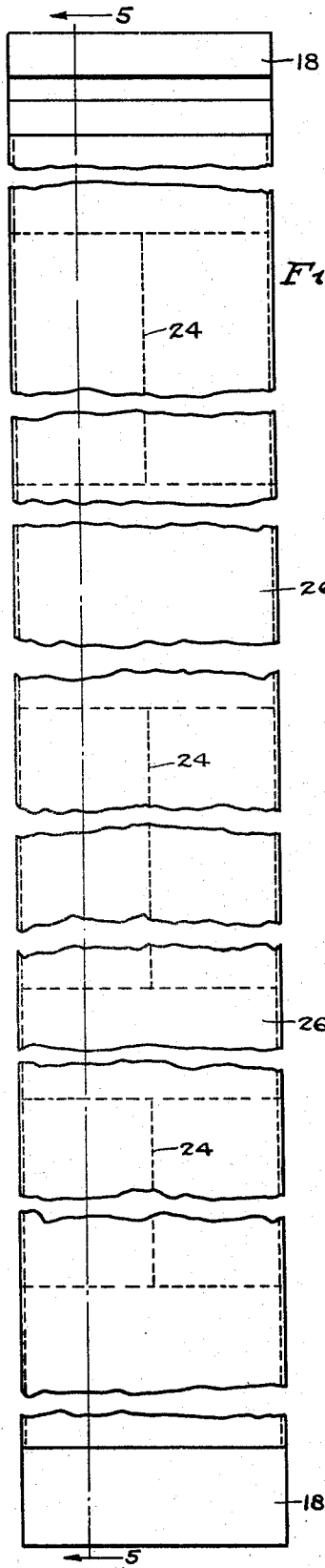
Figure 5:
Figure 6:
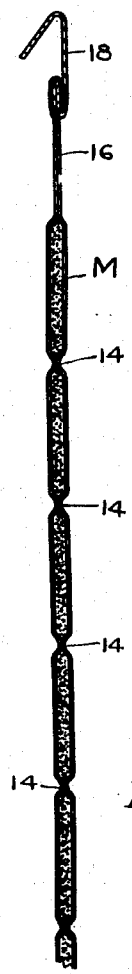
Figure 7:
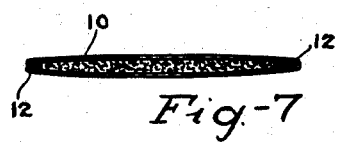

Fig. 1 is a plan view of one form of the invention. Fig. 2 is a plan view of another form. Fig. 3 is a plan view of another form. Fig. 4 is a plan view of another form. Fig. 5 is a view in section on the line 5—5 of Fig. 4. Fig. 6 is a view in section on the line 6—6 of Fig. 1. Fig. 7 is a view in section on the line 7—7 of Fig. 1.

Referring first to the form of the invention shown in Figs. 1, 6, and 7, the numeral 10 designates a tubular casing of previous flexible material such as woven fabric. As shown particularly in Fig. 7, two strips of this material are stitched together at their longitudinal edges as indicated at 12 to produce the casing. This casing is stitched crosswise at intervals as indicated at 14 to form a succession of pockets, each pocket being filled with coffee or other material M and closed by a line of stitching as the filling operation proceeds. A composite ribbon is thus produced which consists of a flat core of the material which is to be subjected to the infusing agent, this core being enclosed in the previous casing. The casing preferably at each of its two ends is left with a short unfilled space as indicated at 16 while secured to the extreme ends are hook members 18 clinched thereto. In the form shown in Fig. 2, a central longitudinal line of stitching 20 is provided in place of the transverse stitching while in the form shown in Fig. 3 several longitudinal lines of stitching 22 are provided. In the forms shown in Figs. 4 and 5, an interrupted longitudinal line of stitching 24 is provided, the portions of the casing not provided with this stitching being left unfilled so that blank sections 26 are provided between a series of pockets filled with the material which is to be treated. All of the forms are preferably provided with blank end portions 16 having hook members 18 secured thereto.

The advantages of my invention will be readily understood in connection with the foregoing description. The composite ribbon including the encased material to be treated may be fed progressively as long as it is desired to continue the operation of subjecting the material to the action of the infusing fluid or agent. The hooks 18 provide interengaging members for hooking together a succession of the ribbons when it is desired to continue the operation for a considerable period of time. The blank end spaces 16 provide against a section of the material not being fully subjected to the infusing agent when the feeding operation is started while the blank sections 26 have the same effect when a complete ribbon is not treated during a continuous period of time. If the coffee or other material to be treated is in a finely ground or pulverized condition, it will be understood that a finer mesh or more closely woven fabric must be employed than is the case when the material is in larger particles or pieces.

I claim:

A ribbon for use in making infusions of coffee and other materials comprising a thin flat layer of such material of extended length such that a portion only of the ribbon will be employed at any one time in making the infusion, such layer being continuous and of uniform thickness, and strips of pervious flexible mesh for holding said material in such continuous thin flat layer.

In testimony whereof I hereunto affix my signature.

HARRY A. MEDIN.